Dec. 2, 1941.  T. A. WILLSON  2,264,351
HEADBAND STRAP FOR GOGGLES, RESPIRATORS, AND THE LIKE
Filed Dec. 5, 1938  2 Sheets-Sheet 1

Inventor
Thomas A. Willson

By *W.G.T.D.M.Stewart*
Attorneys

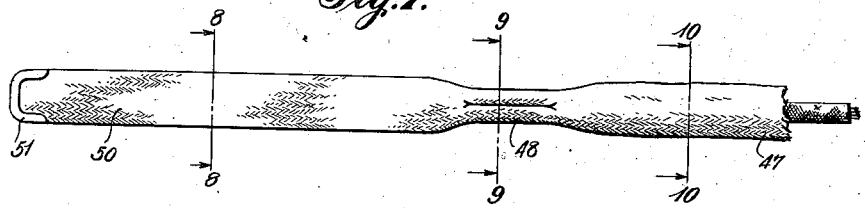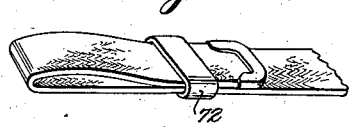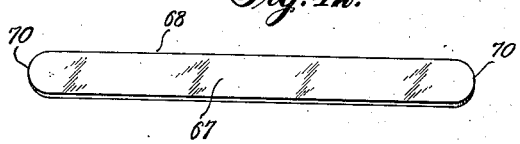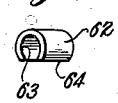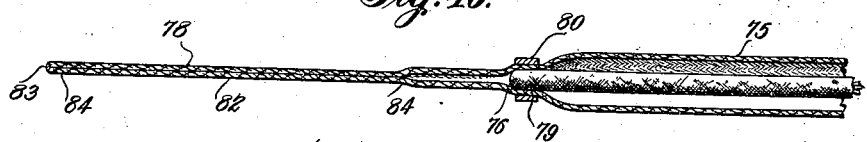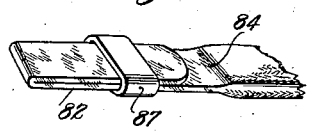

Patented Dec. 2, 1941

2,264,351

UNITED STATES PATENT OFFICE 2,264,351

HEADBAND STRAP FOR GOGGLES, RESPIRATORS, AND THE LIKE

Thomas A. Willson, Wyomissing, Pa., assignor to Willson Products, Inc., Reading, Pa., a corporation of Pennsylvania Application December 5, 1938, Serial No. 244,125

1 Claim. (Cl. 2—14)

This invention relates to elastic headband straps, and more particularly to elastic headband straps of the type used in safety goggles, respirators and the like.

A primary object of the invention is to provide a durable, comfortable and economical headband suitable for use on safety goggles.

Another object of the invention is to provide a safety goggle which will be simple and convenient of assembly and comfortable and durable in use.

Another object of the invention is to provide a composite elastic strand so constructed as to possess an effective limit of elasticity short of that characterizing the elastic material of the strand.

Another object of the invention is to provide an elastic strand which will be strong, durable and economical of manufacture.

Another object of the invention is to provide an elastic headband strap for goggles and the like which will possess a substantial elasticity, together with a positive limit of stretch.

In the manufacture of safety goggles heretofore, it has been found necessary to devote considerable attention to providing a comfortable article. Training of industrial employees and the reduction of numerous and serious industrial accidents is frequently most readily accomplished by providing for employees safety devices which are comfortable and simple of design as well as effective, these objectives rendering it more feasible to improve the safety habits of the employee by habituating him in use of the device. In view of the impracticality of disciplining employees for failure to use safety devices even when provided, the importance of design from the standpoints of comfort and personal suitability will be understood.

The present invention contemplates the provision, for safety goggles, of an elastic headband including adjustable attaching elements at either end and composed therebetween of a composite strand, including a central core of elastic material, preferably round, and a loosely fitting cylindrical cover of braided textile tubing. The composite strand is assembled by rigidly binding the tubing and core adjacent each end with metal clips. Individually adjustable connections to the goggle cups are included to complete a comfortable safety device capable of standardization in manufacture. These connecting elements include soft metal strips forming extensions of the binders, and when covered by the material of the tubular headband they may be easily and simply adjusted to the goggle. In a modified form the metal strips may be separate from the binding clips, and in a further modification may be dispensed with, sufficient stiffness being imparted for purposes of adjustment by impregnating the flattened ends of the outer tubing with cellulose or like material.

With these and other objects in view, the invention consists in certain novel features of construction, as hereinafter described and shown in the drawings illustrative of the preferred and alternative embodiments of the invention. In the drawings:

Fig. 7 shows one end of the headband;

Fig. 8 is a section taken on the line 8—8 of Fig. 7;

Fig. 9 is a section taken on the line 9—9 of Fig. 7;

Fig. 10 is a section taken on the line 10—10 of Fig. 7;

Fig. 11 shows the strap end of Fig. 7, bent and held in attaching condition;

Fig. 12 shows a soft metal strip used in the flattened end of a modified form;

Fig. 13 shows a metal clip used in connection with the latter modification;

Fig. 14 shows a strap end embodying the latter modification;

Fig. 15 shows a strap end manufactured in accordance with another modified form;

Fig. 16 is a section of the structure shown in Fig. 15; and

Fig. 17 shows the strap end of Fig. 15, bent and held in attaching condition.

Referring to the drawings, wherein similar parts are indicated by identical reference numerals:

Figure 1:
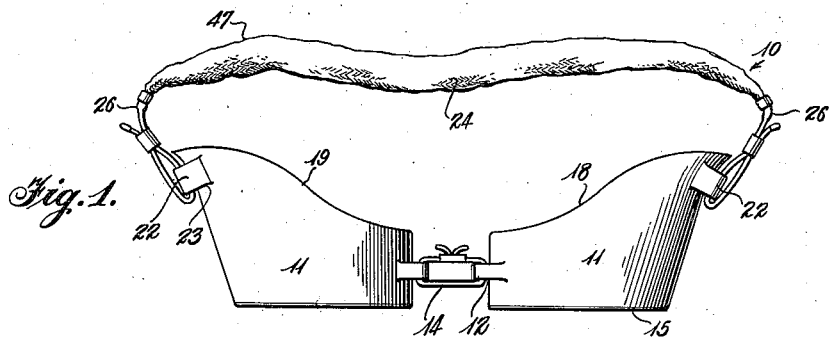
Fig. 1 is a plan view of a pair of cup-type safety goggles, including a headband embodying one form of the invention.

An industrial safety goggle, generally designated by the numeral 10 includes a pair of eye cups 11—11 hinged at 12 to a central nose-piece 14 of any conventional design. The forward edge 15 of each cup 11 retains transparent lens 16 to protect the eye, while the rearward edge 18 is curved at 19 to conform to the contours of the face and provide a lateral projection 20 having an external strap ear 22 formed in the cup material. The safety goggle is retained in position by headband 24, terminating at each end in connecting straps 26—26 which connect the headband to the goggle cups by passing the strap end through ear 22 and folding back to be secured by metal loop 27, constituting a simple metal ferrule for maintaining the goggle in proper assembly during use. Preferably strap 26 is more stiff than the main portion of the headband and may include a self sustaining factor, effectually to prevent its becoming rolled under strap ears 22 and to render the headband easily and simply adjusted. By referring to Figs. 1 and 2, it will be observed that in order to prepare the goggles for comfortable wear by a workman it is only necessary to attach headband 24 by strap 26 to ear 22 at one side of the goggles and then attach the opposite end to the opposite ear 22 of the goggle, while leaving sufficient play in the headband comfortably to accommodate the head of the wearer. The headband is fastened in such adjusted position by passing stiffened strap end 26 around ear 22 for a sufficient portion of its length, and then bending strap 26 rearwardly upon itself sufficiently to maintain the desired adjustment. The end of strap 26 may then be inserted through slidable metal loop or ferrule 27, which will retain the strap end 26 against accidental dislocation.

Figure 2:
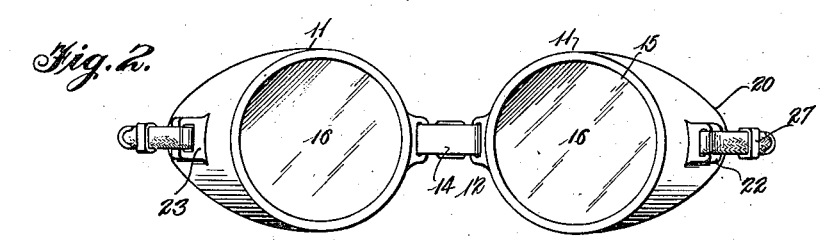
Fig. 2 is a front view thereof.
Figure 3:
Fig. 3 shows a plan view, enlarged for clarity, of a soft metal strip utilized in the preferred form of headband.
Figure 4:
Fig. 4 shows an elastic element suitable for forming the core of the headband.
Figure 5:
Fig. 5 shows a usual braided tube suitable for forming the covering of the headband.
Figure 6:
Fig. 6 shows a metal tip for finishing the strap end of the headband.

In the preferred embodiment of the invention, headband 24 includes an elastic central core 29 of a determined length, preferably comprising, as shown, a braided casing 31 covering rubber or other suitable elastic strands 32. Core 29 thus comprises a well-known composite elastic construction particularly suitable for my present purposes possessing the ability to lie "dead" (without curl) when not under tension. Elastic core 29 is enclosed within a loosely fitting braided tube 34 of cotton or other suitable textile material disposed in loosely contracted fullness over core 29, as shown in Fig. 1, with its extended ends projecting sufficiently to each receive therein a soft metal strip 36 longitudinally aligned with core 29. Although core 29 is shown round in cross-section, it will be understood that same may be flat, as well as free of casing 31.

Strip 36 is shown as an elongated flat area 38 having straight edges 39, and is finished with one curved extremity 40, the opposite end 42 of the metal strip 36 having spaced U-shaped jaws 43—43 each with serrated edges 44—44. Referring to Figs. 7 and 9, it will be observed that jaws 43 constitute a tubular fastening means for assembling the headband. When the strips 36 are fitted in the tube ends on opposite sides of the elastic core 29, the core ends are placed within U-shaped jaws 43. The loose fabric area 47 of braided tube 34 is thrust downwardly in space 46, between serrated edges 44; and, by pressing the serrated edges 44 together jaws 43 may be permanently bent to firmly lock elastic core 29 and braided tube 34 in permanent assembly with strip 36, as at fastening points 48—48, thus maintaining tube 34 over core 29 with the desired fullness shown in Fig. 1.

Beyond fastening points 48 the braided tube 34 extends along metal strip 36 in the form of flat areas 50, the width of strip 36 being such as to eliminate fullness in areas 50. A metal tip 51 of U-shaped cross-section is preferably utilized to finish the headband and has parallel lips 52—52 which overlie the textile tube 34 to bind same permanently about the curved end 40 of strip 36. The end condition of the preferred form of headband is as indicated in Figs. 7 to 10, the portion shown at section 8—8 being characterized by the braid fitting snugly over flat area 38 of the metal strip, and section 9—9 showing the permanent assembly of elastic core within U-shaped jaws 43, the latter also binding the braid cover therein. Section 10—10 illustrates the construction of the portion of the headband engaging the head of the wearer and indicates the fullness of the braid about elastic core 29.

In the preferred construction described, the length of the contracted portion of braided tube 34 is sufficient to cause same to extend forwardly above the ears of the wearer so as to serve as a cushion and prevent discomfort or harm from any cutting or chafing of the wearer at that point. The tension requisite to maintain the goggles in position is asserted by elastic core 29. However, when the core 29 is stretched as in fitting the goggles over the head, there is no danger of rupturing the elastic element because such operation causes the braided tube 34 to be elongated, thereby reducing its diameter so that it closely embraces and binds on the periphery of elastic core 29 and thereby limits the stretch of elastic core 29 within safe limits of the latter. When it is understood that safety goggles are frequently donned several times during the working day, it will be seen that the composite construction described not only comfortably protects the person of the wearer, but insures that the headband will retain its elasticity over long periods of use without becoming too loose for safety.

When the headband is attached to the strap ears 22 of the goggles, the flexibility imparted thereto by the metal strip 36 enables the strap ends to be freely bent to permit easy and simple adjustment even with clumsy unskilled fingers. Furthermore, after adjustment the headband is readily retained in proper position with respect to the goggles by simply adjusting the metal loop 27 along the bent strap ends. The provision of simple metal slide 27 on the bendable strap ends described renders unnecessary the garter-like adjusting devices heretofore employed in safety goggles and which proved troublesome for clumsy fingers. Furthermore, the headband disclosed is in one continuous length instead of in two parts as in the flat elastic strap used heretofore, thus rendering manufacture and assembly more economical. Although the preferred embodiment describes the use of metal loops or ferrules 27 for maintaining the bent strap ends in position after adjustment, it will be understood that these are not essential in many circumstances because the strength of the metal constituting strip 36 will be adequate to retain same after bending to adjustment.

A modified construction whereby the invention may advantageously be practiced is shown in Figs. 11 to 14, inclusive, and utilizes an elastic core 53 similar to core 29 and covered by loosely puckered contracted braided tubing 55 disposed thereon with a loose area 56. Beyond the ends 58—58 of core 53 project flat ends 59 of braided tubing 55 being attached to the ends of core 53 at opposite fastening points 60 by a metal clip 62 having parallel edges 63 and ends 64. In assembling the modified construction, the metal clip 62 is placed around the braided tubing 55 and pinched to bring the parallel edges 63 together, thereby firmly connecting the tubing 55 upon the ends of the elastic core. A soft metal strip 67 is inserted at each end of the headband within flat ends 59 of the braided tubing as a bendable stiffening element in lieu of the metal strip 36 shown in the preferred embodiment. Strip 67 is characterized by straight edges 68 and opposite curved ends 70—70 and possesses the advantage that either end may be inserted in flat tubing ends 59 for convenient mounting. The headband of this modified form is completed by binding the flat tubing ends over the outer strip end 70 by a metal finishing tip 71, as in the manner described above for tip 51. If desired, the headband, after adjustment, as in the manner described for the preferred embodiment, may be maintained in adjustment by applying a simple metal loop 72 as shown in Fig. 11.

Another form of the invention is disclosed in Figs. 15 to 17, inclusive, and differs from the forms previously described primarily in the elimination of the metal strip at the strap ends. This modification includes the characteristic elastic cord 73 covered with the loosely puckered contracted braided tubing 74, gathered in a loose area 75 between ends 76 of elastic cord 73. Therebeyond, the tubing 74 projects in flat ends 78 attached at fastening point 79 by a metal clip 80, similar to the metal clip 62 above described. The projecting portions of the braided tubing at each end of the headband are impregnated, as at 84, by immersion in any cellulosic solution to stiffen same.

The extremities of the impregnated areas are rounded as at 86 to facilitate adjustment and provide a workmanlike finished appearance for the headband. By reference particularly to Fig. 17, it will be observed that the band straps, when impregnated with cellulosic material, will function properly to maintain the headband in adjustment upon the goggle cups much as in the manner described for the metallic strips 38 and 67, such adjustment being maintained, if desired, by fitting thereon a metal loop 87 corresponding to the loops 27 and 72 described above in connection with the previous embodiments.

What I claim is:

An adjustable head-band strap for goggles and the like, comprising a length of tubular fabric having portions at each end thereof flattened and stiffened to form adjustably-bendable goggle-engaging straps, loop members on said straps slidable thereon so as to engage and disengage with return bends of their respective strap ends, and an elastic member loosely enclosed in normally spaced relation within said tubular fabric and having its ends only connected to the latter adjacent said flattened stiffened ends, the diameter of said cover tube being reduced by elongation into contacting binding engagement with the lengthened elastic member so as to limit the ultimate stretch of the latter.

THOMAS A. WILLSON.